Nov. 17, 1931.     W. T. ESCH     1,832,370
HEN'S NEST
Filed Feb. 27, 1929     2 Sheets-Sheet 1
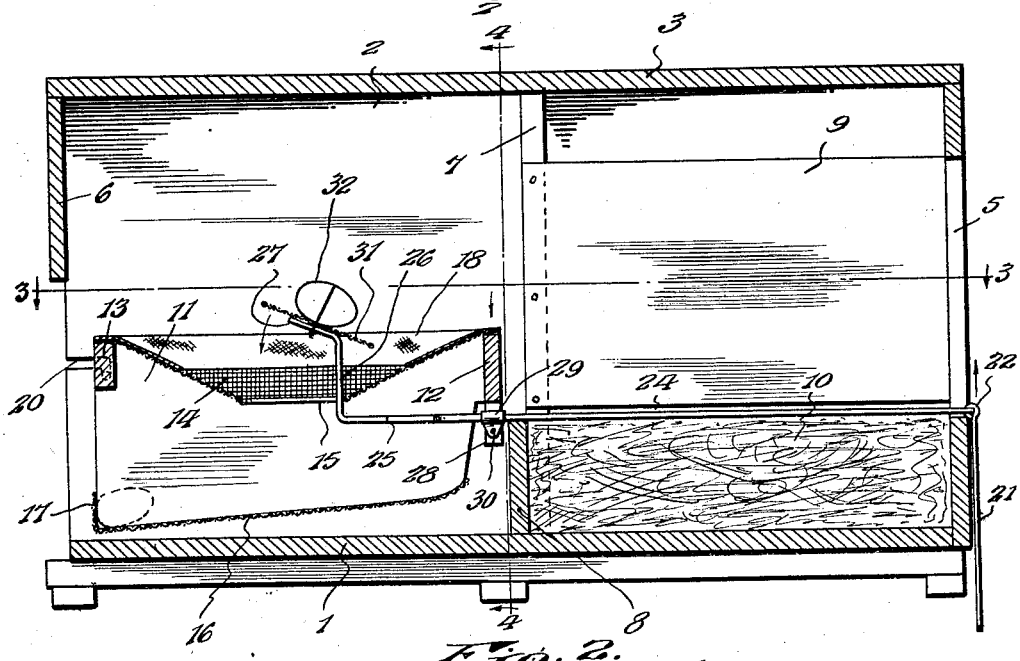
Inventor
W. T. Esch.
By Lacey & Lacey, Attorneys

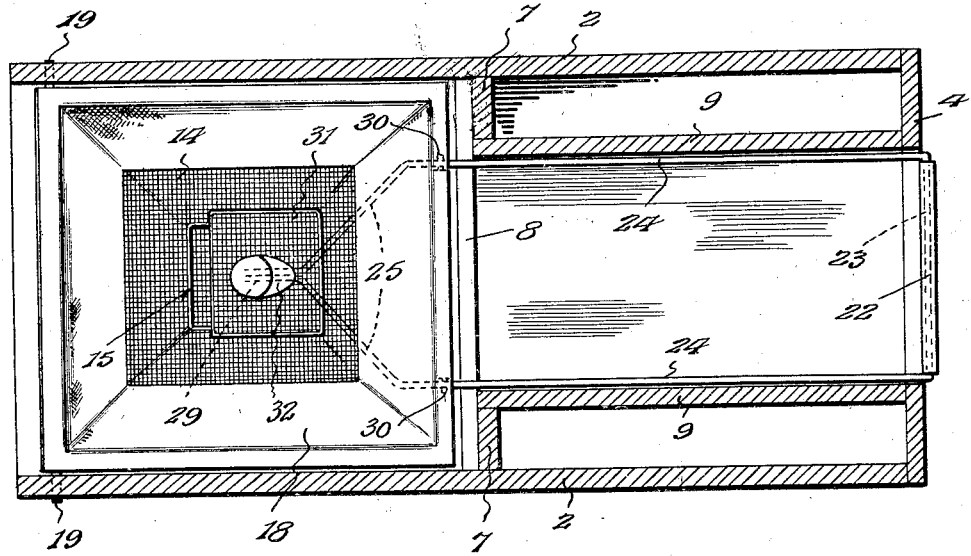
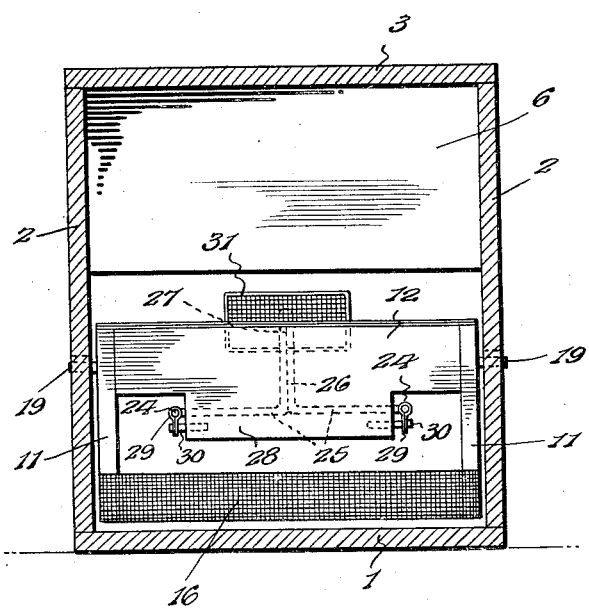
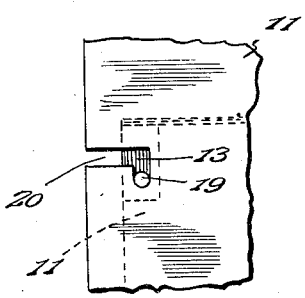

Patented Nov. 17, 1931

1,832,370

UNITED STATES PATENT OFFICE

WILLIAM T. ESCH, OF KALAMA, WASHINGTON

HEN'S NEST

Application filed February 27, 1929. Serial No. 343,064.

This invention relates to animal husbandry and more particularly to a hen's nest.

One object of the invention is to provide a hen's nest having an entrance compartment and a laying compartment, a laying tray being provided in the laying compartment and a door being provided for the inlet of the entrance compartment so connected with the laying tray that when a hen steps upon the tray and depresses it by her weight the door will be moved to a closed position and thereby prevent another hen from entering the nest and disturbing a hen already occupying the same.

Another object of the invention is to keep the laying tray clean and prevent eggs from becoming soiled and also to prevent eggs previously laid from being subjected to the heat of a hen laying an egg.

Another object of the invention is to provide the laying tray with an egg passage through which eggs may pass into a receptacle below the tray and associated with the means for closing the door of the inlet a closure for the egg passage which will be closed when the tray is depressed by a hen stepping upon the tray and will move to an open position in order to allow an egg to pass from the tray into the egg receptacle when a hen steps off the tray.

Another object of the invention is to so arrange the entrance chamber and laying chamber and actuating means for the door and closure for the egg passage that gypsum or the like may be placed in the entrance chamber and thereby cause a hen's feet to be cleaned by walking over the gypsum before stepping upon the laying tray. By this arrangement the laying tray will be prevented from becoming soiled during wet weather when mud is liable to accumulate upon a hen's feet.

Another object of the invention is to allow the laying tray and egg receptacle together with the door closure and actuating means therefor to be bodily removed from the nest as a unit and thereby allow repairs to be easily made and the nest and laying tray thoroughly cleaned and disinfected when necessary.

The invention is illustrated in the accompanying drawings, wherein

Figure 1 is a longitudinal sectional view through the improved nest before being occupied by a hen, Fig. 2 is a view similar to Fig. 1 showing a hen upon the laying tray and the door and closure for the egg passage shut, Fig. 3 is a longitudinal sectional view taken horizontally through the nest on the line 3—3 of Fig. 1, Fig. 4 is a vertical sectional view taken transversely through the nest on the line 4—4 of Fig. 1, and Fig. 5 is a fragmentary view in elevation of the rear portion of one side wall of the nest to show the manner in which the laying tray is pivotally mounted.

The improved hen's nest includes a housing having a bottom 1, side walls 2, a top 3, a front wall 4 in which an inlet or doorway 5 is formed and a rear wall 6 which terminates in spaced relation to the bottom thereby leaving the housing partially open at its rear, as shown clearly in Figs. 1 and 2. Strips 7 are secured against the inner faces of the side walls in front of a short partition extending between the side walls upon the floor or bottom and facing boards 9 extend between the strips 7 and front wall with their rear ends secured to the strips and their forward ends secured against the inner face of the front wall at opposite sides of the inlet. These facing boards are spaced from the bottom and, therefore, when a quantity of gypsum or the like 10 is placed in the forward portion of the housing between the front wall and the partition 1 which may be referred to as an entrance chamber, portions of the gypsum may extend beneath the facing boards and cause it to be held in place. This gypsum will absorb moisture and form a coating upon mud and other dirt adhering to a hen's feet while the hen is passing through the entrance chamber.

In the laying chamber is disposed a laying tray including a frame having side walls 11 connected at their front and rear by cross bars 12 and 13 which extend between the upper portions of the side walls and terminate in spaced relation to the lower edges thereof. These walls 11 and cross bars carry a sheet or tray proper 14 consisting of a sheet of wire fabric which tapers downwardly toward its center where it is formed with an opening 15 constituting an egg passage so that eggs may pass through this passage and drop upon a sheet of wire mesh 16 secured against the lower edge faces of the walls 11 and forming a bottom for the tray. The lower edges of the walls 11 slope downwardly toward the rear of the tray and at their front they are curved, as shown in Figs. 1 and 2. Therefore, the sheet 16 slopes rearwardly and an egg will move rearwardly thereon until it reaches an abutment or wall 17 formed by turning the rear portion of the sheet 16 upwardly and securing it against the rear edge faces of the walls 11. Since the tray 14 and sheet 16 are formed of wire screening, particles of gypsum and dried dirt which become detached from a hen's feet may pass through them to the bottom of the nest and thereby keep the nest clean. A facing 18 formed of fabric is applied to the upper face of the sheet or tray 14 in order to protect it and prevent danger of a hen injuring her feet by stepping upon the wire sheet from which the tray is formed. It also makes it more comfortable when a hen is setting upon the laying tray. This laying tray is to have pivotal movement in a vertical direction so that it may normally remain in a substantially horizontal position but be depressed when stepped upon by a hen. In order to do so, there has been provided pivot pins 19 which project from opposite ends of the rear cross bar 13 and are received in bayonet slots 20 formed in the side walls 2 of the housing and opening through the rear edges thereof. By this arrangement the laying tray will be pivotally mounted and prevented from slipping out of its proper position in the laying chamber but by moving it upwardly it may be drawn rearwardly out of the laying compartment.

In order to close the inlet 5 and prevent another hen from entering the nest while it is occupied, there has been provided a door 21 formed preferably of sheet metal and having its upper end formed with a transverse sleeve or bearing 22 to receive the forward end portion or cross rod 23 of actuating means. This actuating means consists of strong wire which is bent to form side arms 24 extending rearwardly from the cross rod 23 and having their rear portions bent to extend towards each other, as shown at 25, and then upwardly close to each other to form a standard 26 terminating in a rearwardly extending arm 27. The side bars 24 are of greater length than the entrance chamber and, therefore, they extend into the laying chamber and into the laying tray between the upper and lower walls thereof. These side rods extend upon opposite sides of the reduced intermediate portion 28 of the front cross bar 12 and pass through bearings 29 which are pivotally mounted upon pins 30 extending from opposite sides of the reduced portion 28, as shown clearly in Fig. 4. It should be noted that the side rods extend across the upper edge of the partition 8 and, therefore, this partition will constitute a fulcrum across which the rods may rock. The door is of sufficient weight to normally remain in a lowered opened position and retain the laying tray in an elevated or substantially horizontal position, as shown in Fig. 1, but when a hen steps upon the tray, the weight of the hen will cause the tray to be forced downwardly and rock the rods across the partition so that their forward ends swing upwardly and the door will be raised to a closed position, as shown in Fig. 2. By this arrangement another hen will be prevented from entering an occupied nest. A sheet 31 which is of greater dimension than the egg passage is secured against the rearwardly extending arm 27 and upon this sheet which may be referred to as a closure for the egg passage is secured a nest egg 32, although the nest egg may be omitted if so desired. From an inspection of Figs 1 and 2, it will be seen that under normal conditions the closure 31 is normally held in an elevated or opened position but when the nest is depressed by the weight of a hen stepping thereon it will be moved into closing relation to the egg passage. Therefore, the egg passage will be closed while the laying tray is occupied and there will be no danger of a hen being injured by stepping into the opening. When the hen steps off the nest after laying an egg, the tray and closure will be returned to the elevated position shown in Fig. 1, thereby uncovering the egg passage and allowing an egg to pass through the same and drop upon the sheet 16 along which it will roll until it strikes the abutment wall 17. Since the door 21 moves downwardly to an open position as soon as a hen leaves the laying tray, the inlet will be opened so that the hen may leave the nest and another enter the same. In view of the fact that the side rods are free from the partition or fulcrum 8, they and the door 21 will be moved rearwardly when the tray is moved upwardly to lift the pins out of the depending inner ends of the bayonet slots and drawn rearwardly out of the laying chamber. Therefore, the laying tray together with the door and actuating means may be withdrawn from the housing as a unit and any necessary repairs or cleaning can be very easily accomplished.

Having thus described the invention, I claim:

1. A nest comprising a housing having an inlet, a laying tray in said housing movable vertically and adapted to be depressed by the weight of a fowl, a closure for said inlet movable vertically into open and closed positions and normally in an open position, said tray having an egg passage, a closure for the egg passage, and actuating means in said housing supporting the closure for the egg passage and connected with the closure for the inlet and retained in a normal position by the weight of the closure for the inlet with the closure for the egg passage in an open position, the said actuating means having operative connection with said tray and adapted to be moved to shut the closures when the tray is depressed.

2. A nest comprising a housing having an inlet, a laying tray in said housing movable vertically and adapted to be depressed by the weight of a fowl, a closure for said inlet movable vertically into open and closed positions and normally in an open position, said tray having an egg passage, a closure for the egg passage, a fulcrum in said housing, and actuating means in said housing extending across said fulcrum and pivoted to the tray and having its outer end connected with the closure for the inlet and its inner end engaged with the closure for the egg passage, the said actuating means being adapted to be rocked across the fulcrum to shut the closures when the tray is depressed.

3. A nest comprising a housing having an inlet, a laying tray in said housing pivotally mounted at its rear, a fulcrum in front of said tray, a door for said inlet movable vertically into open and closed positions and being normally in a lowered open position, actuating means in said housing extending across the fulcrum and pivotally connected with said tray, the door being connected with the outer end of the actuating means and moved upwardly to a closed position when the tray is depressed and the actuating means rocked across the fulcrum, said tray having an egg passage formed therein and the inner end portion of the actuating means being extended beneath the tray and up through the egg passage, and a closure for the egg passage carried by the inner end of the actuating means and adapted to move downwardly into closing relation to the egg passage when the tray is depressed.

4. A nest comprising a housing having an inlet at its front and partially open at its rear, a partition dividing said housing into a laying chamber and an entrance chamber and constituting a fulcrum, a laying tray in the laying chamber, a support for said tray having front and side walls, the side walls being pivotally mounted at their rear, a bottom carried by the side walls, said tray being formed with an egg passage, a lever pivoted to the front wall and having arms extending over the fulcrum and through the entrance chamber to the inlet, the rear portion of said lever extending beneath said tray and upwardly through the egg passage, a closure for the egg passage secured to the rear end of said lever and adapted to close the egg passage when moved downwardly, and a door for the inlet suspended from said arms and adapted to close the inlet when the lever is rocked across the fulcrum by depressing the tray, said door having sufficient weight to normally remain in a lowered open position and retain the tray and closure for the egg passage elevated.

5. A nest comprising a housing having an inlet at its front and being open at its rear, a laying tray in said housing pivotally mounted therein and adapted to be withdrawn through its open rear portion, said tray having an egg passage, closures for the inlet and egg passage, and common actuating means for the closures pivoted to the tray and supporting the closures, the closures being normally open and being moved to closed positions when the tray is depressed, the said actuating means and closures being free from the housing and adapted to be withdrawn from the housing with the tray.

6. A nest comprising a housing having an inlet, a laying tray in said housing pivotally mounted therein, said tray having an egg passage, closures for the inlet and egg passage, and common actuating means for the closures pivoted to the tray and supporting the closures, the closures being normally open and being moved to closed positions by the actuating means when the tray is depressed.

7. A nest comprising a housing having an entrance at its front and being open at its rear, a fulcrum in said housing intermediate its front and rear, a laying tray in the rear portion of said housing movable vertically, a yoke pivoted to said tray and extending forwardly through the housing across said fulcrum, and a door for the entrance connected with the forward end of said yoke and moved to a closed position when the tray is depressed and the yoke rocked across the fulcrum.

In testimony whereof I affix my signature.

WILLIAM T. ESCH. [L. S.]